UNITED STATES PATENT OFFICE.

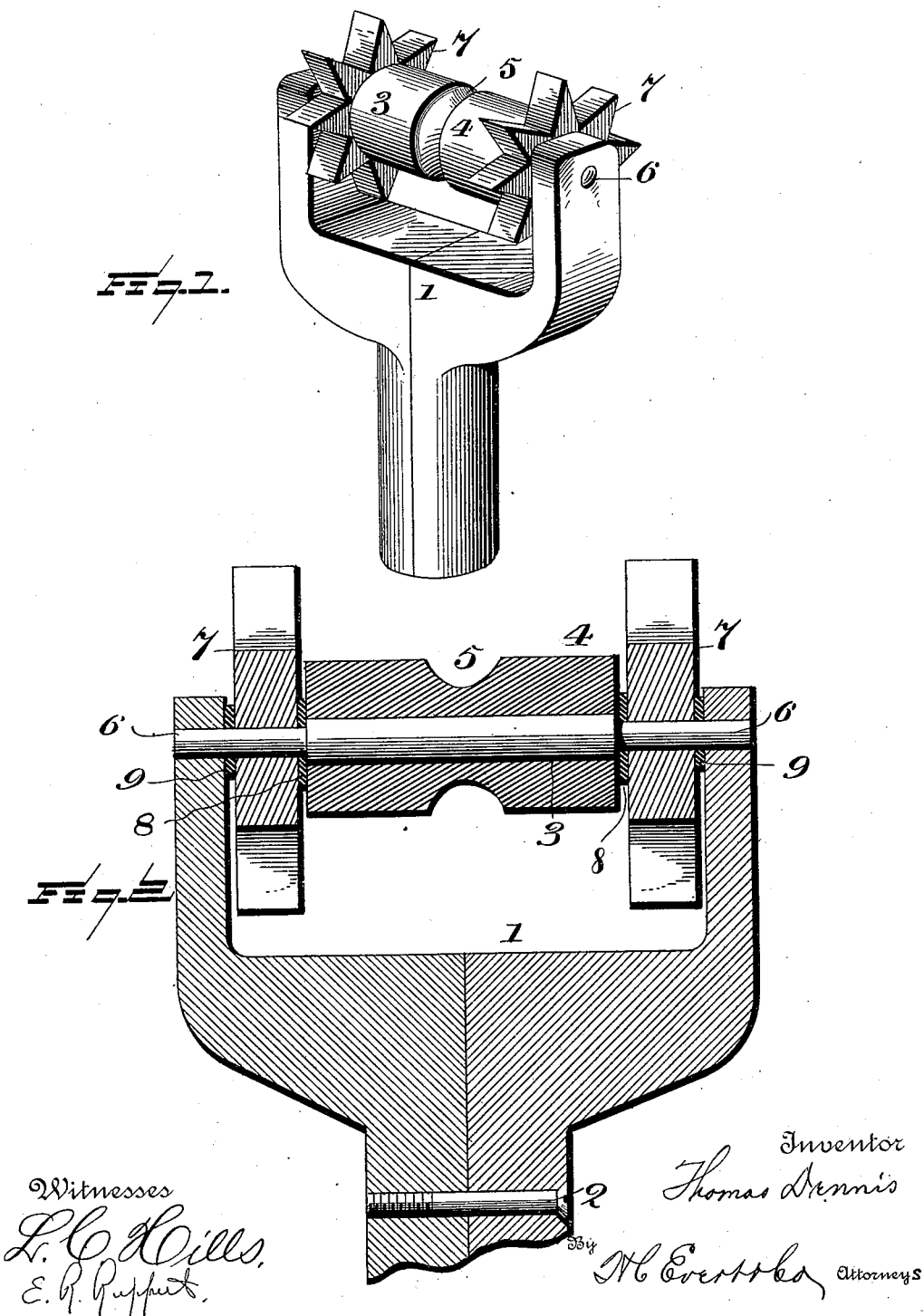

THOMAS DENNIS, OF NEW CASTLE, PENNSYLVANIA.

TROLLEY.

SPECIFICATION forming part of Letters Patent No. 645,351, dated March 13, 1900.

Application filed July 22, 1899. Serial No. 724,788. (No model.)

*To all whom it may concern:*

Be it known that I, THOMAS DENNIS, a citizen of the United States of America, residing at New Castle, in the county of Lawrence and State of Pennsylvania, have invented certain new and useful Improvements in Trolleys, of which the following is a specification, reference being had therein to the accompanying drawings.

My invention relates to improvements in trolley-heads; and the object of the invention is a head of simple and inexpensive construction and which will insure the retention of the trolley-wheel at all times with the trolley-wire.

Briefly described, the invention consists of a two-piece harp, the members or sections being exactly similar in construction and having mounted therein for rotation a suitable axle or shaft, upon which is mounted a roller which acts as the trolley-wheel and is centrally grooved on its periphery to receive the trolley-wire. The journal ends of this shaft or axle are reduced and have mounted thereon, between the ends of the roller acting as the trolley-wheel and the prongs of the harp, a pair of toothed wheels, which act as the guards for the retention of the trolley-wheel in engagement with the trolley-wire. The roller or trolley-wheel and the pair of toothed guard-wheels are each adapted to rotate independently of each other to insure free and easy working of all the parts.

My invention will be hereinafter more specifically described, and then particularly pointed out in the claim, and in describing the invention in detail reference is had to the accompanying drawings, forming a part of this specification, and wherein like numerals of reference will be employed for designating similar parts throughout both views, in which—

Figure 1 is a perspective view of my improved trolley-head, and Fig. 2 is a vertical sectional view of the same.

To put my invention into practice, I provide a suitable harp 1, which is preferably formed in two equal sections or members, which may be securely fastened together by a bolt or screw 2, as shown, or other suitable means. The prongs of this harp are provided, near their free ends, with apertures for the reception of the axle or shaft upon which the trolley-wheel and guard-wheels are mounted. This axle or shaft 3 has centrally mounted thereon for rotation a roller 4, which is provided with a centrally-arranged peripheral groove 5, adapted to receive the trolley-wire. (Not shown.) The ends 6 6 of the axle or shaft 3 are reduced in size and are journaled in the apertures provided therefor in the prongs of the harp. Mounted upon these reduced ends 6 6 of the shaft or axle 3, between the ends of the trolley roller or wheel and the prongs of the harp, is a pair of toothed guard-wheels 7 7, adapted to rotate freely upon the said axle or shaft and the teeth of which project above the periphery of the roller or trolley-wheel in order to keep the trolley-wire in engagement with the latter. In order to insure the independent operation of the roller or trolley-wheel and of either of the toothed guard-wheels, I mount upon the reduced ends of the shaft or axle, between the ends of the roller and the inner faces of the guard-wheels, a washer 8 and also between the outer face of the guard-wheels and the inner face of the harp-prongs a washer 9, these washers being loosely mounted upon the shaft or axle and serving to separate the guard-wheels from the trolley wheel or roller, so as to prevent frictional contact of one with the other and insure the independent operation of each of the wheels.

The manner of assembling the parts will be readily apparent from the drawings, as it will be observed that by constructing the harp in two equal members the rotatable parts may be placed upon the shaft or axle in their respective positions, the journal ends of the shaft or axle then placed in the prongs of the harp, and the two members or sections of the latter then securely fastened together.

The trolley wheel or roller is adapted to engage the trolley-wire with the latter normally in the peripheral groove 5, and when out of such engagement is prevented from passing in its lateral movement beyond the ends of the roller or trolley-wheel by the guard-wheels 7 7. As these guard-wheels strike the cross or guy wires and are rotated thereby the tooth striking the wire is turned downward and another tooth on the wheel is brought into position to guard the trolley-wire and prevent the latter passing from the roller or trolley-wheel, one of the teeth on each wheel being always in position to prevent the trolley wheel or roller leaving the trolley-wire.

It will be noted that various changes may be made in the details of construction without departing from the general spirit of my invention.

Having fully described my invention, what I claim as new, and desire to secure by Letters Patent, is—

A trolley-head comprising in its construction a harp formed of two equal sections secured together, a shaft or axle journaled in the said harp, said shaft or axle being of greater diameter at the central portion than at its journaled ends, a roller mounted for rotation upon the larger portion of said shaft or axle and of the same width as the said enlarged portion of the said shaft or axle and provided with a centrally-arranged peripheral groove, a toothed wheel mounted for rotation upon the smaller portion of the said axle at each side of the said roller and within the harp, and a washer mounted upon the smaller portion of the said shaft or axle between the said roller and each of the toothed wheels and between each of the toothed wheels and the inner face of the upper ends of the harp, substantially as described.

In testimony whereof I affix my signature in the presence of two witnesses.

THOMAS DENNIS.

Witnesses:
JOHN NOLAND,
REES JOSEPH.